Feb. 23, 1937.   W. C. BRADEN   2,071,493
FLUID POWER TRANSMISSION
Filed June 29, 1933   5 Sheets-Sheet 1

INVENTOR.
William C. Braden
BY Kenyon + Kenyon
ATTORNEYS.

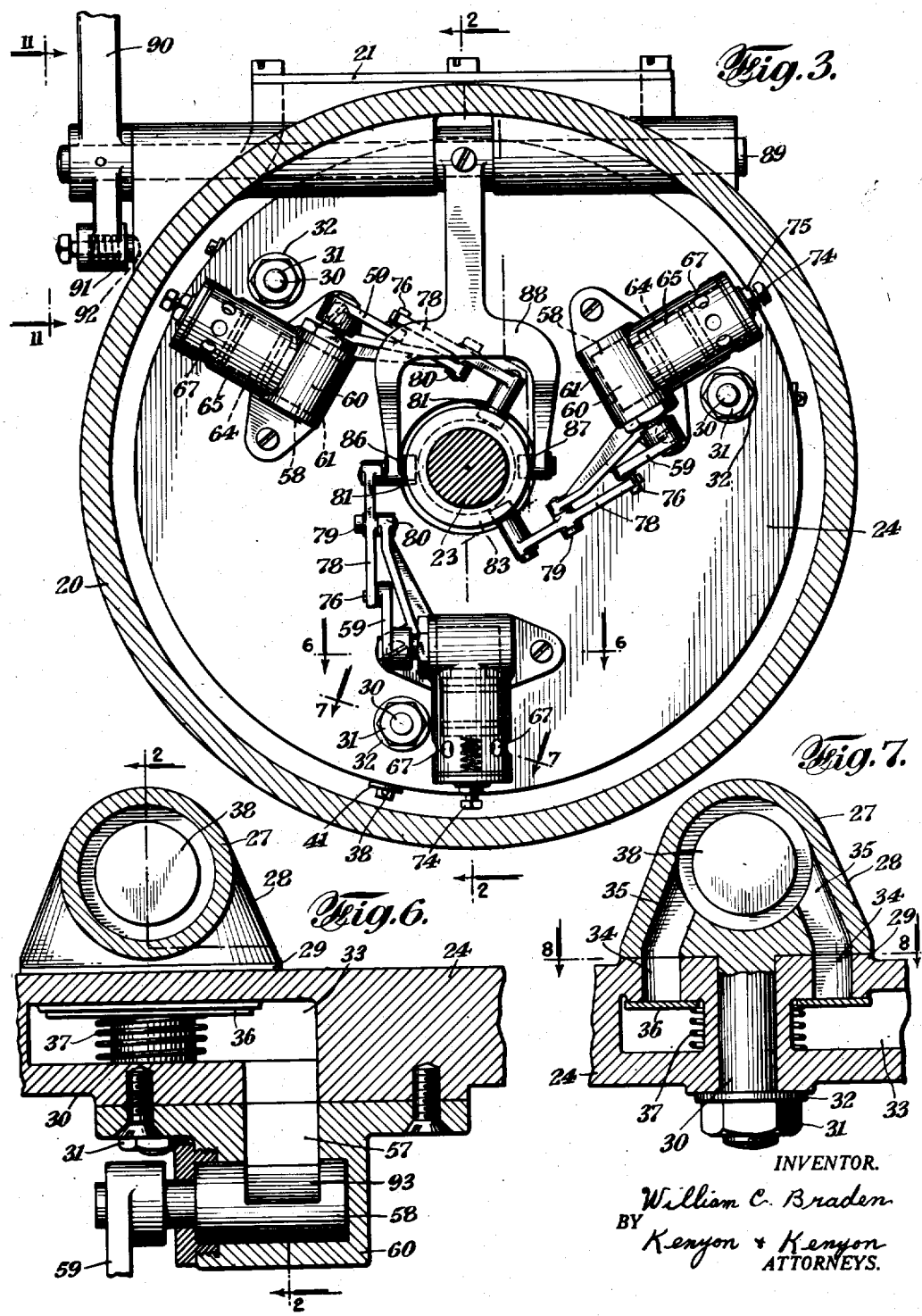

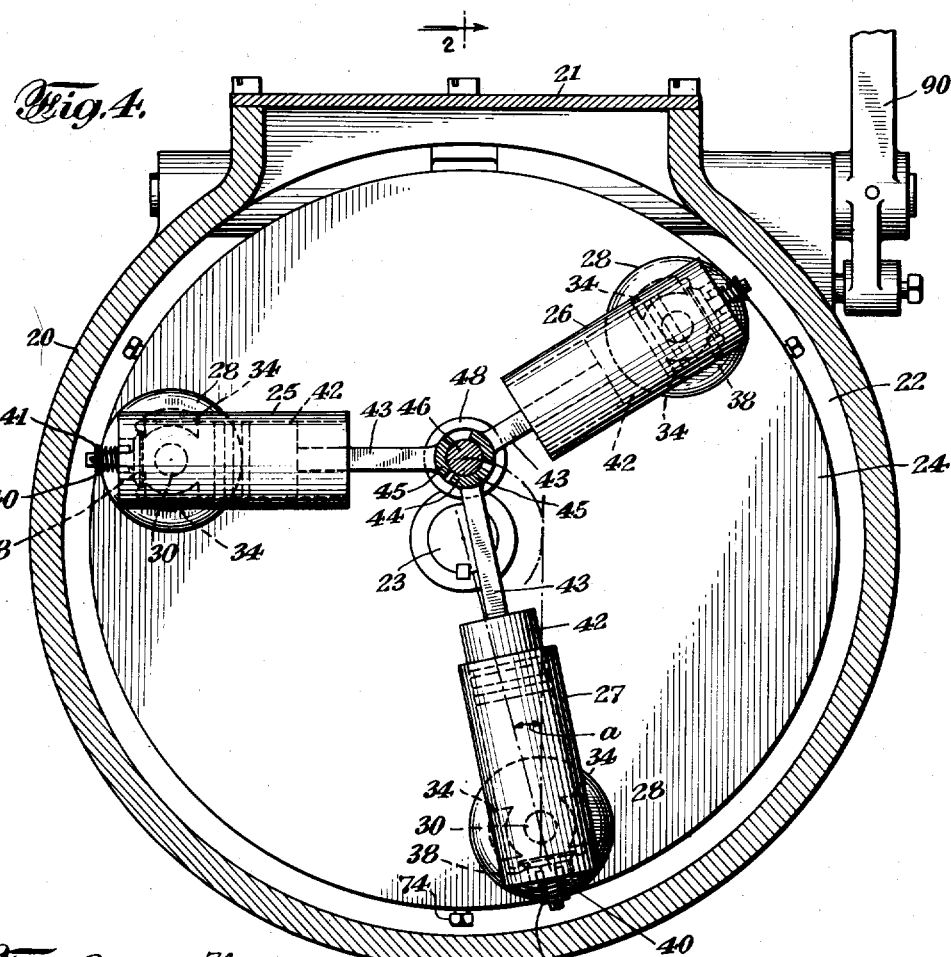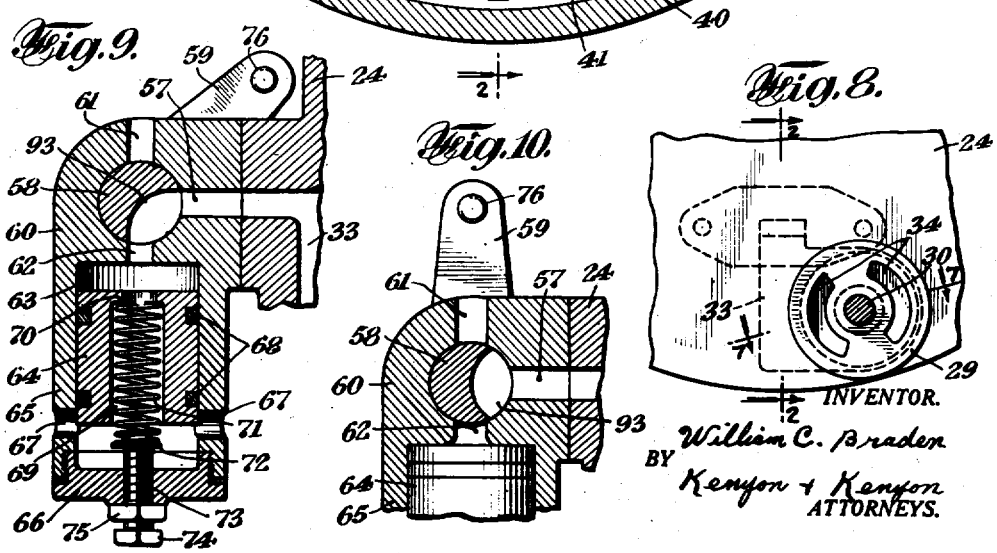

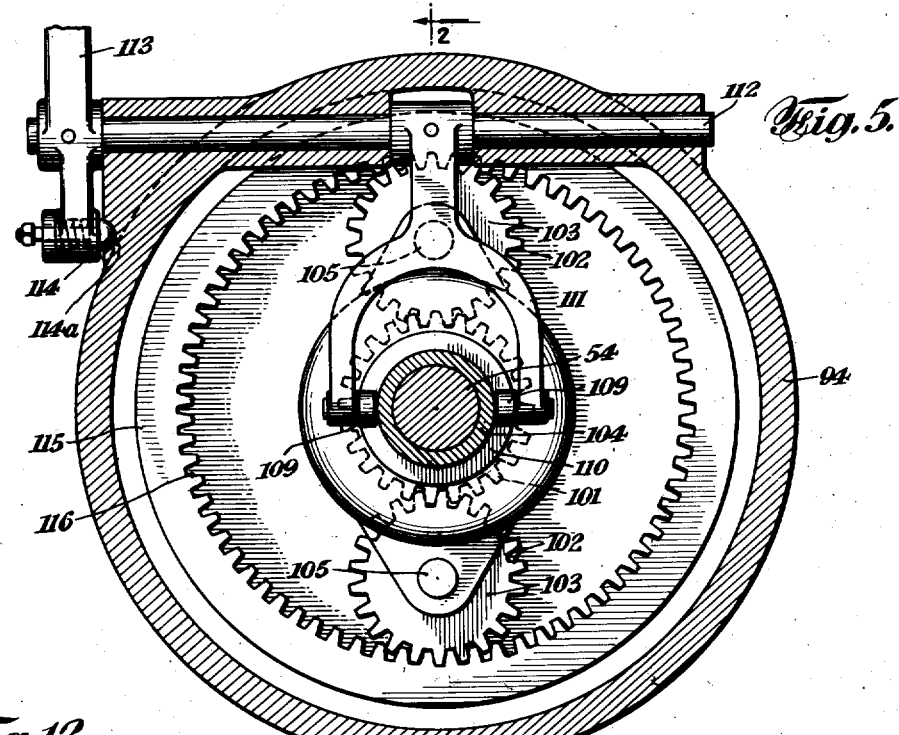
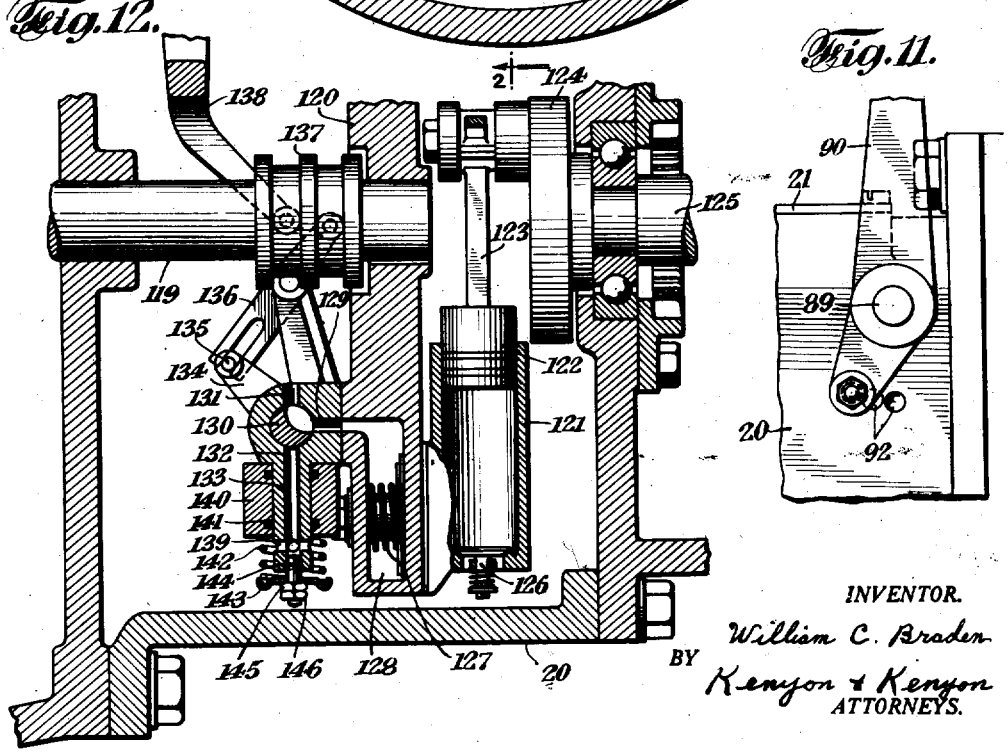

Feb. 23, 1937.     W. C. BRADEN     2,071,493
FLUID POWER TRANSMISSION
Filed June 29, 1933     5 Sheets-Sheet 5
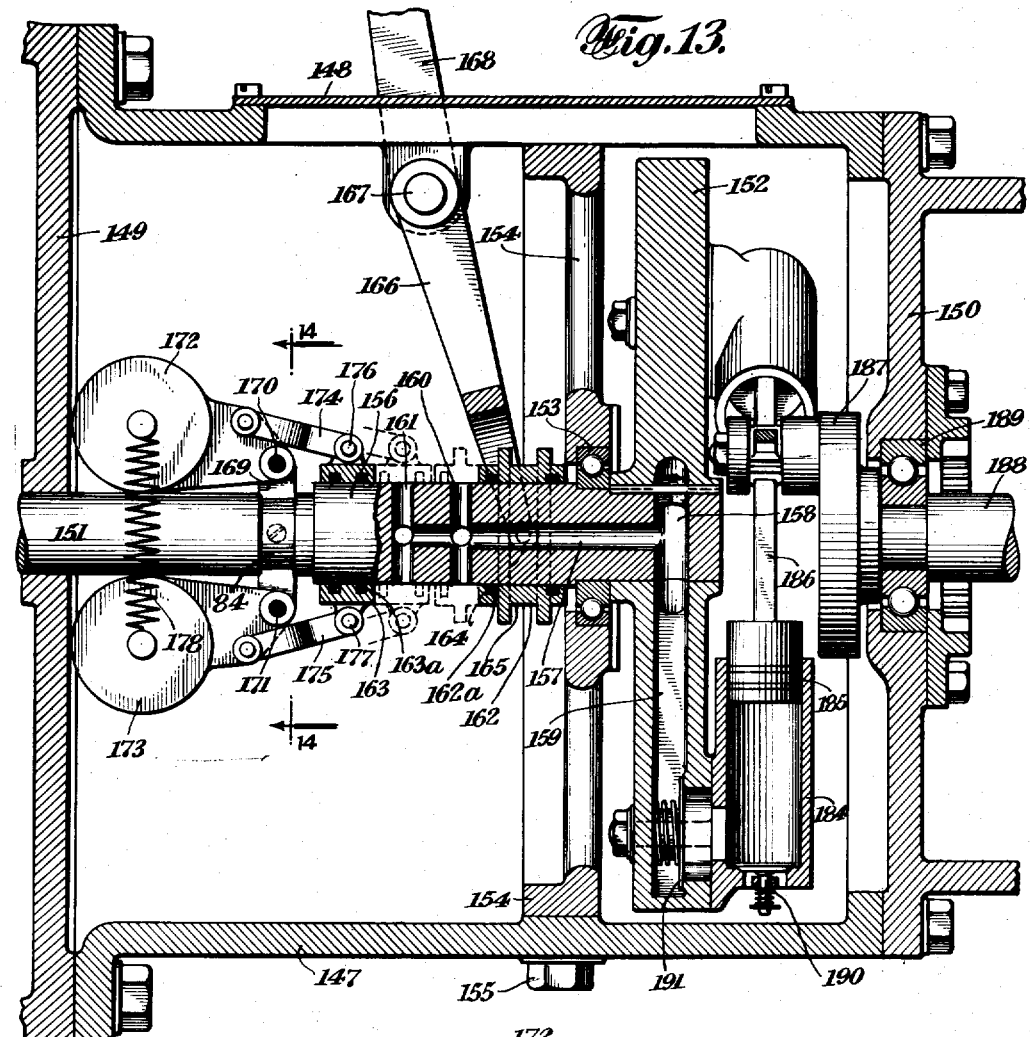
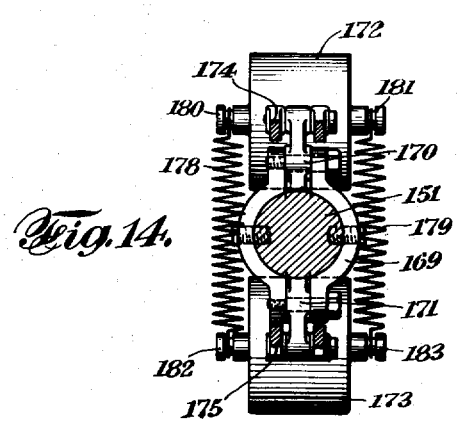
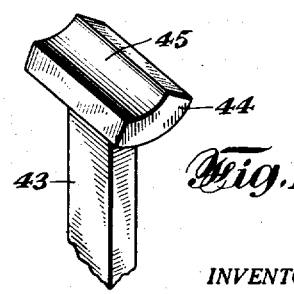
INVENTOR.
William C. Braden
BY Kenyon & Kenyon
ATTORNEYS.

Patented Feb. 23, 1937

2,071,493

UNITED STATES PATENT OFFICE 2,071,493

FLUID POWER TRANSMISSION

William C. Braden, Brooklyn, N. Y., assignor of one-half to Thomas S. Pates, Brooklyn, N. Y.

Application June 29, 1933, Serial No. 678,129

32 Claims. (Cl. 192—60)

This invention relates to a hydraulic or fluid device for transmitting power from a driving shaft to a driven shaft and for controlling, changing or preventing relative rotation between these shafts. The invention is applicable wherever it is desired to drive one shaft from another and to vary the degree of relative rotation therebetween and, if desired, to prevent such relative rotation. It is also applicable where it is desired to brake a rotating shaft by dissipating power therefrom to an element which is rotating at a less speed or is at rest.

In the present embodiment the invention will be described in its application to the transmission mechanism of automotive vehicles, with particular reference to an automobile, though it will be understood that the embodiment here described may be used in forms of automotive vehicles other than automobiles.

One object of the embodiment of this invention here described is to provide a gearless and clutchless transmission whose operation may be entirely dependent upon the speed of rotation of the engine or may, at the will of the operator, be controlled independently thereof. Thus, the difference between the speed of rotation of the motor driving shaft and of the driven or propeller shaft may be automatically related to the absolute speed of rotation of the motor driving shaft so that at idling speed thereof no power may be transmitted and above idling speed power may be transmitted without slippage and at various intermediate speeds the amount of slippage may be inversely proportioned to the speed of the motor driving shaft; or this relationship may be modified at the will of the operator by selective means enabling the driving shaft to be connected to the driven shaft without slippage, or to be disconnected therefrom for complete absence of power transmission therebetween, at any speed.

Another object of this embodiment of the invention is to provide a novel arrangement of parts adapted to secure the objects above described, and among others to provide centrifugal means associated with the driving shaft to control the degree of slippage between the driving shaft and the driven shaft, novel means for connecting the hydraulic pumping devices to a common crank pin, and the like.

Among the advantages which derive from the embodiment of the invention here described are making the controls of an automobile simpler than those now in common use, diminishing the frictional loss of power which is inherent in gear transmission devices, eliminating loss of fuel during intervals between shifting gears, obtaining the maximum power from the engine because of its operation at higher and more efficient speeds when delivering power with resulting quick pick-up from a start, diminution of noise and weight, prevention of stalling of the motor through overloading, elimination of the necessity of changing gears on a hill, and obtaining a selective "free wheeling" effect which may be obtained at any speed at the choice of the operator or, if left to automatic operation, may be avoided at high car speeds and obtained at lower car speeds.

Referring to the annexed drawings which form a part of this description—

Figure 2 is a section along the lines 2, 2 of Figures 3, 4, 5, 6 and 8, certain parts being broken away.

Figure 3 is a vertical transverse section on the line 3, 3 of Figure 2.

Figure 4 is a vertical transverse section on the line 4, 4 of Figure 2.

Figure 5 is a vertical transverse section on the line 5, 5 of Figure 2.

Figure 6 is a horizontal section on the line 6, 6 of Figures 2 and 3, looking downwardly.

Figure 7 is a diagonal section on the line 7, 7 of Figures 2, 3 and 8, looking diagonally downwardly.

Figure 8 is a vertical transverse section on the line 8, 8 of Figures 2 and 7.

Figure 9 is a partial vertical transverse section on the same plane as that of Figure 2, showing the moving parts in another position.

Figure 10 is similar to Figure 9 showing the moving parts in still another position.

Figure 11 is a side elevation showing the portion indicated at 11, 11 in Figure 3.

Figure 12 is a partial vertical longitudinal section of a modified form of the device shown in Figure 2.

Figure 13 is a vertical longitudinal section of a modified form of power transmission device embodying my invention.

Figure 14 is a vertical transverse section on the line 14, 14 of Figure 13.

Figure 15 is a perspective view of one end of the connecting rod 43 showing the T-shaped head thereon for engagement with the driving pin 46.

In accordance with the present invention a positive pumping action is provided when the driving shaft rotates relatively to the driven shaft tending to pump fluid from a supply chamber into a pressure chamber. Means, both selective and controlled by the absolute speed of rotation of the driving shaft, are provided to control or prevent, either singly or in cooperation, the return flow of fluid from such pressure chamber to the supply chamber and thus to vary, either selectively or automatically in the manner stated, the back pressure load on the pumping mechanism to vary the flow of power between the driving shaft and the driven shaft.

Figure 1:
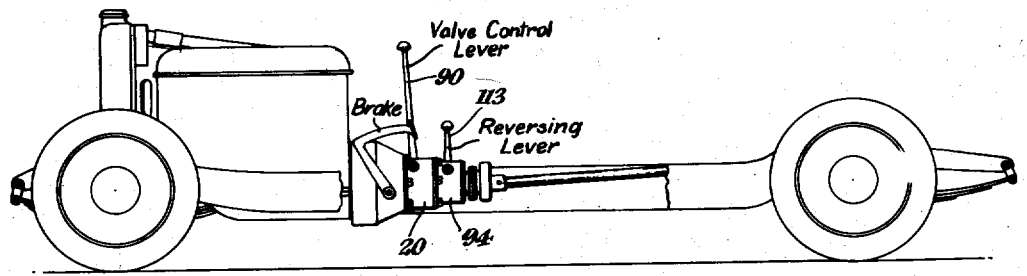
Figure 1 represents diagrammatically a side elevation of the chassis of an automobile showing the location and general arrangement therein of the parts hereinafter described.

Referring to the drawings, the power transmission device here described, in either of the three forms or embodiments which are here described, is mounted in an automobile rearwardly of the fly wheel casing, and in the position usually occupied by the clutch and gear transmission mechanism now in ordinary use as indicated in Figure 1.

Preferred form (Figs. 2–11, 15)

Referring first to the preferred form of this device, a casing 20 having a removable cover 21 and end plates 22 and 56 provide an oil-tight chamber A. A driving shaft 23 suitably journaled (by a bearing not shown) in end plate 22 is connected to the engine and extends into and terminates within said chamber A. Upon the end of shaft 23 which extends within chamber A is keyed a disc 24 for rotation within said chamber. In the description which follows the expression "righthand face" of the disc 24 will be understood to refer to the face of said disc which is remote from the motor, and "lefthand face" will be understood to refer to the face of said disc which is nearer to said motor.

Upon the righthand face of said disc and adjacent the periphery thereof are pivotally mounted a plurality of cylinders 25, 26 and 27 adapted for rotation with said disc within the chamber A. Each of said cylinders is provided with a swiveled mounting base 28 adapted to engage a mount 29 forming a part of the disc 24. Each of said cylinders is provided with a mounting pin 30, preferably formed integral with the mounting base 28 thereof and adapted to extend through the disc 24 and to be screw-threadedly engaged by a nut 31 on the lefthand face of said disc 24. A washer 32 interposed between the nut 31 and the lefthand face of the disc 24 permits oscillation of the cylinder 27 and the mounting pin 30 relative to the disc 24 without loosening of the nut 31.

Fluid chambers 33 formed within disc 24 are respectively connected by ports 34 with channels 35 formed in the swiveled mounting base 28 and communicating with the interior of the cylinders 25, 26 and 27. While the description which follows will be directed to a single one of the plurality of pivotally mounted cylinders and associated chambers, ports and valves, it will be understood that the other cylinders and associated parts are identical with the cylinder and parts described. While it is, for the purposes of the present invention, immaterial how many sets of cylinders and associated parts are employed, provided there are more than one thereof, the apparatus here described embodies three such cylinders mounted 120° apart. Ports 34 are arcuate in shape in order that channels 35 may remain in register therewith within the limits of arcuate movement of the channels 35 when the cylinder 27 and its mounting base 28 oscillate in the manner hereinafter described. An annular valve 36 positioned within chamber 33 and covering ports 34 is gently urged to a seat upon and covering said ports by a coiled spring 37. The function of this valve is to prevent return flow of fluid from the chamber 33 through ports 34 and channels 35 into cylinder 27, and to offer no material obstruction to the free flow of fluid in the opposite direction, as hereinafter described.

The pivoted cylinder 27 is provided at its outer end nearest the periphery of the disc 24 with a mushroom valve 38 adapted to seat upon inlet ports 39 which furnish a fluid communication from chamber A to the interior of cylinder 27. A helical spring 40 mounted upon the end of the cylinder 27 and bearing against a washer 41 secured to the stem of the mushroom valve 38 gently urges the valve to a seated position covering the ports 39. The function of this valve is to prevent return flow of fluid from the interior of cylinder 27 to chamber A, and to offer no material obstruction to the free flow of fluid in the opposite direction, as hereinafter described.

Within each of the cylinders 25, 26 and 27 is positioned a piston 42 for reciprocation therein. Secured to each of said pistons is a connecting rod 43 having (see Fig. 15) a T-shaped head 44 provided longitudinally thereof with an arcuate segment 45 adapted to engage driving pin 46. Cup-shaped retainers 47 and 48 mounted coaxially with driving pin 46 engage the projecting ends of the several heads 44 while in contact with driving pin 46 and maintain the same so that the arcuate segmental channels 45 are at all times in engagement with the periphery of the driving pin 46 (see Fig. 4) but are free to move circumferentially thereof as the driving pin moves through its circle of rotation hereinafter described. The cup-shaped retainers 47 and 48 are provided with flanges 49 and 50 respectively which engage the outer surface of the heads 44 remote from the arcuate segmental channels 45 thereof. The cup-shaped retainer 48 is secured upon the end of driving pin 46 by a nut 51 screw-threadedly engaged with a reduced end portion 52 of the driving pin 46.

The arcuate segments 45 of the several T-heads have an angular width adapted to permit movement of these T-heads relative to each other on the driving pin 46. To this end the arcuate segments 45, when all of the T-heads are in engagement with the pin 46, do not engage all parts of the circumference of the pin. Sufficient free space is permitted between the respective sectors of contact (as seen in cross section in Fig. 4) to permit the T-heads to approach and recede from one another through a small arc as driving pin 46 moves through its circle of rotation relative to disc 24. The amount of free space which must be provided expressed in degrees of arc, depends upon the "angular offset" of pin 46. This may be defined as the angle at the pivotal center of any one of the cylinders (e. g., at the axis of pivot 30 on which cylinder 27 is mounted) between a line passing through such pivotal center and the axis of shaft 54, and a line passing through such pivotal center and the axis of pivot pin 46 at its position of maximum offset with respect to such cylinder. Such angle, herein called the "angular offset" of pin 46, is indicated at a in Figure 4. Thus, the amount of free space which must be provided about the periphery of pin 46, expressed in degrees, is the angular offset of the driving pin 46 multiplied by the number of cylinders. Expressed in another way, the total angular width of all of the arcuate segments 44, expressed in degrees, must not be greater than 360° less the angular offset of pin 46 multiplied by the number of cylinders.

Driving pin 46 is secured near the periphery of a disc 53 keyed upon driven shaft 54 which extends into and terminates within chamber A. Driven shaft 54 is rotatably mounted in axial alinement with driving shaft 23, and is journaled in bearing 55 mounted in plate 56.

The operation of the cylinders 25, 26 and 27 with their associated pistons connected by crank arms to a common mounting on driving pin 46 is as follows. The oil-tight chamber A is partially filled with a suitable fluid. For this purpose ordinary crank case oil of a good grade will be adequate. It is not necessary that the chamber be completely filled. Upon rotation of the driving shaft 23 and the disc 24, while the disc 53 and the driven shaft 54 are at rest, a pumping action will be set up in the cylinders 25, 26 and 27 tending to draw fluid into said cylinders through ports 39 on the suction stroke of the piston and to expel fluid therefrom into the chambers 33 through passages 35 and ports 34 on the compression stroke of the piston. For this purpose the mushroom valve 38 and the annular valve 36, with their associated coiled springs, are adapted to permit the flow of fluid from chamber A into the cylinders 25, 26 and 27 but to prevent return flow thereof on the return stroke of the piston, and to permit discharge of fluid from cylinders 25, 26 and 27 to the chamber 33 on the compression stroke of the piston but to prevent return flow thereof on the return stroke of the piston. Thus, a one-way pumping action is produced tending to transfer fluid from chamber A to the fluid chamber 33 within plate 24. Such pumping action persists as long as there is relative rotation between disc 24 and disc 53 and fluid is permitted to flow through the valves hereinafter described.

In one of its aspects, this invention is directed broadly to controlling the return flow of fluid from chamber 33 to the main body of fluid in chamber A, and for opposing such return flow to a degree depending upon the speed of rotation of the driving shaft 23 or upon the will of the operator independently of such speed.

On the left hand face of disc 24 and adjacent the periphery thereof are mounted a number of valve members, hereinafter described, each corresponding to one of the cylinders 25, 26 and 27, and equal in number thereto. The description which follows will relate to a single one of these valve members but it will be understood that the others are like the one described.

A port 57 communicating with chamber 33 leads to a manually operable rotary valve 58 having an arm 59 secured upon one end thereof and providing the means whereby the valve 58 may be rotated through a predetermined arc. Valve 58 is mounted within a cylindrical casing 60 having an outlet port 61 for discharge of fluid to the chamber A, and a port 62 communicating with a cylindrical chamber 63 in which is positioned a balanced piston valve 64. The chamber 63 is provided with cylindrical side walls 65 and a bottom cover plate 66. Outlet ports 67 provide fluid communication from the interior of cylindrical chamber 63 to chamber A.

The balanced piston valve 64 comprises a piston member adapted to fit within the cylindrical chamber 63 for lengthwise movement thereof. Piston rings 68 provide substantially oil-tight engagement with the internal walls of the cylindrical chamber 63. The piston valve 63 is longitudinally drilled at 69. Annular shoulders 70 at the inner end of this drilling provide an abutment for one end of the spring 71 hereinafter described. A coil spring 71 is positioned within the drilling 69 with its inner end in abutment with the shoulder 70 and its outer end in abutment with a washer 72 secured upon an adjustable screw-threaded member 73 having an adjusting head 74 and a lock nut 75 for securing the same in adjusted position. The screw-threaded member passes through and is screw-threadedly engaged with the bottom cover plate 66, and the locking nut 75 is adapted to engage therewith.

I prefer to arrange the mounting of the valve members above described in offset position with respect to the pivotal mounting of the cylinders 25, 26 and 27. That is, the valve mechanism associated with a particular one of these cylinders is not immediately opposite this cylinder but is removed therefrom a few degrees along the periphery of disc 24. The advantage of such an arrangement is to avoid interference between the supporting bolts thereof, and also, by positioning the valve mechanism so that it trails the cylinder with which it is associated, the flow of fluid from the cylinder to the valve mechanism is promoted by the inertia of the fluid as disc 24 rotates.

The length of the cylindrical chamber 63 and the position of the ports 67 in the side walls 65 thereof, and the length of the piston valve 64 are such that when the valve is at the inner limit of its motion (with the spring extended) the ports 67 are uncovered and fluid may pass from port 62, through drilling 69 and escape through ports 67; but when the valve 64 is at the outer limit of its movement (against the compression of the spring 71) the ports 67 will be covered and closed by the valve 64.

The weight of the piston valve 64, the distance of the entire valve mechanism here described from the center of the disc 24, and the resistance to compression of the spring 71 are so adjusted that the piston valve 64 will be moved outwardly against the resistance of the spring by centrifugal force, when the driving shaft 23 and the disc 24 are rotated. The degree of this movement, and the resulting degree to which the ports 67 are closed, thus depends upon the speed of rotation of the shaft 23 and the disc 24.

In the outer end of arm 59 is fixed a pin 76 adapted to slide within the groove 77 of a lever 78 fulcrumed near its mid-point on a pin 79 which is secured in a bracket 80. Bracket 80 is mounted on the lefthand face of disc 24. The opposite end of lever 78 carries a roller 81 which rides within channel 82 of a collar 83 mounted upon shaft 23. Collar 83 is loosely and slidably mounted upon shaft 23 and is free to slide longitudinally of the shaft in the manner hereinafter described.

Within a second channel 85 formed in the collar 83 ride two rollers 86, 87 supported in the depending ends of a yoke 88 fixed upon a crossshaft 89. A hand valve control lever 90, fixed upon shaft 89, is provided with a positioning device comprising a spring-held plunger 91 adapted to register with depressions 92 in the external surface of casing 20 for selective positioning of lever 90. It will be understood that each of the valves fixed upon the lefthand face of the disc 24 is provided with a similar control mechanism terminating in a roller resting in channel 82. Thus as the sliding collar 83 is moved longitudinally along shaft 23 the cylindrical valve member 58 associated with each of these valves is rotated, and all are under the control of the operator through selective adjustment of the position of hand control lever 90.

Figure 2:
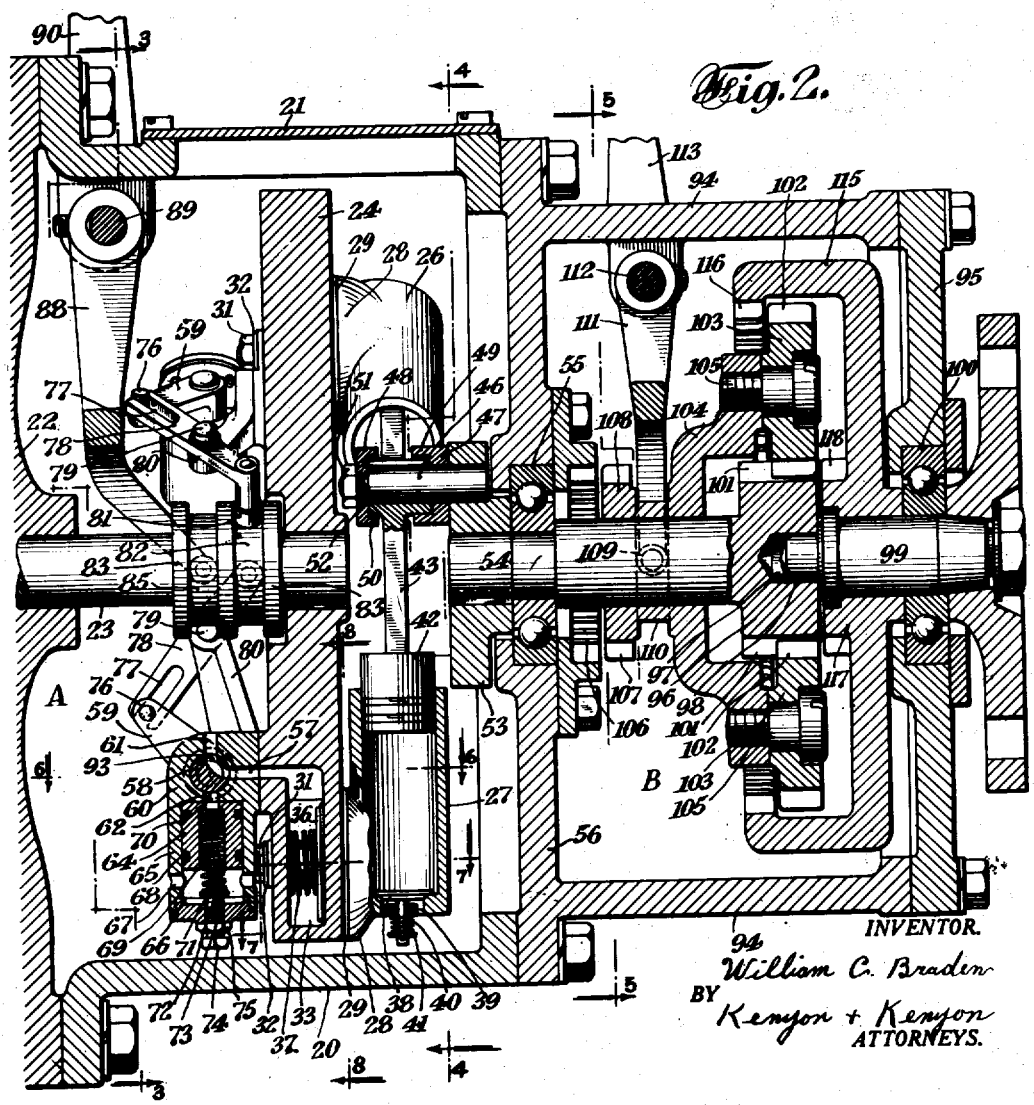
Figure 2 is a vertical longitudinal section of the preferred form of the embodiment of the invention here described, including both the power transmission device and the reversing mechanism.

The arrangement is such that movement of the hand lever 90 within the limits of its motion simultaneously rotates to an equal degree all of the rotary valves 58 associated with the respective valve mechanisms. When valve control lever 90 is moved to its forward position (as shown in Fig. 2), the sliding collar 83 is moved to its rearward position near disc 24 and the levers 78 and arms 80 and the respective valves are moved to the position shown in Figure 2. In this position the cylindrical valve member 58 (as seen in cross-section in Fig. 2) is moved to the counter-clockwise limit of its arc of movement. In this position the cutaway portion 93 of rotary valve 58 is so positioned as to cause ports 57 and 61 to be in communication and thus to permit fluid to pass from chamber 33 through port 61 to escape into chamber A.

When valve control lever 90, and its associated parts above described are moved from the position above described towards the opposite limit of their movement, rotary valve 58 is rotated (as seen in cross-section in Figs. 9 and 10) in a clockwise direction. At the intermediate position, shown in Figure 10, the cutaway portion 93 is so positioned that port 57 is not in fluid communication either with port 61 or port 62. In this intermediate position fluid within chamber 33 and port 57 is sealed therein against escape to the chamber A. At the opposite limit of rotation of the valve member 58, shown in cross-section in Figure 9, the cutaway portion 93 is so positioned as to bring port 57 and port 62 into fluid communication. In this position fluid may flow from chamber 33 through ports 57 and 62, into cylindrical chamber 63. The escape of such fluid through the drilling 69 of piston valve 64 and through ports 67 to chamber A is thereupon under the control of the centrifugal force acting upon piston valve 64.

The operation of the foregoing, when used as a transmission in an automobile, is as follows. Assuming the car to be at rest and the valve control lever 90 to be in its rearward position so that valve 58 is in the normal position shown in Figure 9, the motor is started and brought up to idling speed. Upon rotation of disc 24 relative to disc 53 which is at rest, a pumping action will be set up in the cylinders 25, 26 and 27 tending to draw in oil through ports 39 and to force it past annular valve 37 into chamber 33. Such oil will escape through ports 57 and 62, through the interior drilling 69 of balanced piston valve 64 and through ports 67 to return to the main body of oil in chamber A. The weight of the balanced piston valve 64 and the resilience of spring 71 are so adjusted that, when the motor is at idling speed, the centrifugal force operating upon piston valve 64 will be insufficient to move it outwardly against the resistance of springs 71, and accordingly the ports 67 will remain uncovered. Accordingly, so long as the engine is maintained at idling speed, the oil will be vented freely from chambers 33 to the main oil chamber A and there will be no substantial resistance to the pumping action and accordingly no substantial or material amount of power will be transmitted from the driving shaft 23 to driving pin 46 or to driven shaft 54.

When it is desired to transmit power from the motor shaft 23 to the driven shaft 54, it may be done in either of two ways. If an entirely automatic action is desired, it is only necessary to increase the speed of the motor. This will cause disc 24 to rotate more rapidly and the centrifugal force operating upon piston valves 64 will increase so as to move the same outwardly against the compression of the springs 71. As these valves so move, ports 67 are partially covered or entirely sealed. As the opening in ports 67 become restricted (for example, as shown in Fig. 9) the flow of oil through these ports becomes restricted and pressure builds up in chamber 33 tending to resist the inward compressive strokes of pistons 42 working in cylinders 25, 26 and 27. Such resistance is transmitted to driving pin 46 and tends to cause it, and disc 53 to which it is secured, to rotate in the same direction as disc 24.

The compressive resistance of springs 71 may be so adjusted that when it is desired to bring an automobile from rest to full speed it is only necessary to open the engine throttle and the centrifugal forces operating upon balanced piston valves 64 will so control the flow of power from driving shaft 23 to the driven shaft 54 that the maximum power of the engine may be delivered to the rear driving wheels without shifting of gears or loss of momentum during the period of acceleration from rest to full speed.

Alternatively, power may be selectively applied by manipulation of the valve control lever 90, thus selectively restricting the oil flow from port 57 by manually adjustable means. It will be understood that such use of the valve control lever 90 would be for exceptional or unusual situations, and not for ordinary driving.

When the automobile is moving at full speed under power of the engine, balanced piston valves 64 will be positioned under the influence of centrifugal force so as to cover and close the ports 67 thus preventing escape of oil from chamber 33 and thus building up a sufficient back pressure to prevent any further pumping of oil from chamber A into chambers 33. In this situation, the pistons 42 will be substantially locked in position in their respective cylinders and there will be substantially a rigid driving connection from disc 24 through cylinders 25, 26 and 27, connecting rods 43 and driving pin 46 to disc 53, and thus power will be transmitted from driving shaft 23 to driven shaft 54 substantially without slippage or relative rotation therebetween.

The same effect may also be obtained by manually moving arm 59 and rotary valve 58 to the intermediate position shown in Figure 10. It is intended, however, that this shall be used only for certain exceptional situations, and not for ordinary use in driving. For example, if it is desired to start the motor from the rear wheels, by rolling downhill or by towing, it is only necessary to move rotary valve 58 to the position shown in Figure 10 to secure a rigid driving connection between the motor shaft and the driven or propeller shaft, notwithstanding the fact that the motor is at rest.

When the automobile is climbing a hill so steep as would make necessary, in a gear-shift car, a change of gears to a higher ratio, such change is avoided in the apparatus here described because, as the speed of rotation of driven shaft 54 and driving shaft 23 diminishes, the centrifugal force operating upon balanced piston valves 64 will diminish and these valves will move inwardly in response to the expansive force of the springs 71, thus partially uncovering the ports 67 and permitting a partial release of oil pressure within chamber 33. Such release will permit a pumping action to be set up, thus introducing a degree of relative rotation between driving shaft 23 and driven shaft 54. Thus, as the car loses speed in climbing the hill, the speed of the motor does not decrease proportionally but may continue at a speed high enough to obtain the maximum power from the motor. Accordingly, the automatic transmission here described permits, when properly adjusted, a degree of slippage between the engine shaft and the propeller shaft roughly corresponding to the difference in speeds which are introduced in the shifting of gears in cars now in common use.

To obtain a "free wheeling" effect when the car is moving at full speed and rotary valve 58 is in the normal position shown in Figure 9, the valve control lever 90 may be moved to its forward position so that the rotary valve 58 is rotated counter-clockwise to the position shown in Figure 2. In this position oil in chamber 33 is freely vented to chamber A independently of the speed of rotation of disc 24 and a free pumping action will be set up in the cylinders 25, 26 and 27. As a result, no power will be transmitted between shafts 23 and 54 and the motor can be throttled down to idling speed while the car coasts under its own momentum. As soon as the motor has slowed down sufficiently to permit piston valves 64 to uncover ports 67, valve control lever 90 may be returned to its initial position so that rotary valve 58 is in the position shown in Figure 9, and further application of power may thereupon be made dependent upon the speed of the motor.

If, however, it is not desired to "free wheel" at high speed, which is sometimes regarded as dangerous, a partial free wheeling effect may be obtained at lower speeds only by the apparatus here described. Thus, when the car is moving forward at full speed under power, the engine throttle may be closed and while the speed of the engine is sufficiently high to maintain piston valves 64 in a position covering ports 67, the engine will operate as a drag on the car and will tend to slow it down. As the speed both of the car and of the engine is reduced, however, a point is reached at which piston valves 64 will move inwardly to uncover ports 67 thus permitting an escape of oil and permitting slippage to be introduced in the propeller shaft and the motor driving shaft. With a suitable adjustment of the tension of the springs, this slippage may be arranged to give a free wheeling effect below the speeds which may be dangerous.

The arrangement is effective for use in driving in traffic, since it is not necessary to take the car out of gear when stopping, inasmuch as reduction of car speed by braking or otherwise automatically disconnects the engine from the rear wheels, and such connection is subject to being restored only (so long as rotary valves 58 are in the normal position shown in Fig. 9) by again increasing the engine speed. Accordingly, the only controls necessary for operating the car in traffic are the engine throttle, a brake, and the steering mechanism, eliminating all need for the shifting of gears between different speeds or between rest and any speed, of the car.

*Reversing gear*

In connection with the form or embodiment of the invention described in connection with Figure 2, there is shown a reversing gear situated in chamber B positioned rearwardly of chamber A. A casing 94 which may for convenience be formed integral with plate 56, and a back-plate 95 form a chamber B in which the reversing mechanism is positioned. Driven shaft 54 is provided at its righthand end (as seen in Figure 2) with an enlarged portion 96 having on its end face and coaxial therewith a recess 97 adapted to receive the reduced end 98 of a propeller shaft 99 journaled in a bearing 100 supported by back-plate 95. The enlarged portion 96 is provided about its periphery with gear teeth 101 for engagement with the teeth 102 of pinions 103 hereinafter described.

Slidably mounted upon shaft 54 is a member 104 having at one end thereof mountings 105 for pinions 103 in balanced eccentric position with respect to the main axis of member 104. The teeth 102 of these pinions are adapted to engage teeth 101 of the enlarged portion 96 above referred to. Member 104 is adapted to slide longitudinally of shaft 54 for the purpose and by the means hereinafter set forth.

Secured to plate 56 is an internally-geared circular rack 106. Gear teeth 107 formed upon an enlarged end portion 108 of member 104 are adapted to engage with the teeth of the rack 106 when member 104 is moved to the left-hand end of its limit of movement. Rollers 109 are positioned in an annular channel 110 formed in member 104. Rollers 109 are secured to the depending ends of a yoke 111 fixed upon crossshaft 112 to which is secured a hand reversing lever 113. The reversing lever 113 is provided with a spring-pressed plunger 114 cooperating with depressions 114a in the casing 94 for maintaining the lever in predetermined selective position.

Upon propeller shaft 99 is fixed a wheel 115 provided with internal gear teeth 116 adapted to engage teeth 102 of pinions 103 at the outer periphery thereof when the member 104 is at the lefthand limit of its movement (as seen in Fig. 2). Upon an annular boss 117 forming a part of wheel 115 are positioned gear teeth 118 adapted to engage the teeth 102 of pinions 103 at the inner periphery thereof when the member 104 is at the righthand limit of its movement.

The operation of the reversing mechanism is as follows. When reversing lever 113 is moved to its rearward position, yoke 111 is moved to its forward position and member 104 is moved to its lefthand position (as seen in Fig. 2) bringing teeth 107 into engagement with the teeth of rack 106. In this position member 104 is locked against rotation. At the same time teeth 102 of pinions 103 are brought into engagement with the internal teeth 116 of the wheel 115. Teeth 102 of pinions 103 remain at all times in engagement with the teeth 101 of driven shaft 54. In this position pinions 103 rotate about their respective fixed centers and thus transmit reverse rotation to the wheel 115. In this position the device is adapted to reverse the rotation of driven shaft 54.

When reversing lever 113 is moved to its forward position, member 104 is moved to its rearward or righthand position (as seen in Fig. 2). In this position teeth 107 disengage from the rack 106 and thereupon member 104 is free to rotate. At the same time teeth 102 of pinions 103 engage teeth 118 of the wheel 115. Inasmuch as teeth 102 remain at the same time in engagement with prolongations or extensions of teeth 101 fixed upon driven shaft 54, the effect is to lock together shafts 54 and 99 for rotation together in the same direction. In this position the device is adapted for forward movement without reversal.

In the intermediate position, shown in Figure 2, there is no engagement of teeth 102 of pinions 103 with any teeth of the wheel 115, nor is there any engagement of teeth 107 with rack 106. In this position there is no transmission of power from shaft 54 to shaft 99 and there may be free relative rotation therebetween. In this position it may be said that the device is in "neutral".

*First alternate form (Fig. 12)*

The first modified form of the transmission device above described is as follows, having particular reference to Figure 12 of the drawings. Inasmuch as this form of device differs from the preferred form hereinabove described chiefly in the construction of the automatic fluid escape valve mechanism, the description will be mainly directed to that feature, and it will be understood that the description of the first modified form of device here referred to incorporates by reference the description above given with respect to those parts which are common, or similar to each other, in the preferred form of the device and in the first modified form here described.

Driving shaft 119 has secured on the end thereof which projects within oil-tight chamber A a rotating disc 120. Upon the righthand face of this disc are pivotally mounted a plurality of pumping cylinders 121 each having a piston 122. The connecting rods 123 of these pistons are secured upon a common driving pin (not shown) secured near the periphery of a disc 124 secured upon driven shaft 125 mounted coaxially with driving shaft 119. One-way spring-held valve mechanisms 126 and 127 are provided so that oil or other fluid contained in chamber A will be pumped by reciprocation of pistons 122 in cylinders 121, when there is relative rotation between discs 120 and 124, into chambers 128 formed within disc 120. The description which follows will be addressed to a single one of these chambers 128, as illustrative of others. Port 129 leads from chamber 128 to manually controllable rotary valve 130 having return vent 131 to chamber A and also communicating with channel 132 leading through tube 133.

The control mechanism for rotary valve 130 is the same as that for valve 58, above described, and comprises arm 134, pin 135, fulcrumed lever 136, sliding collar 137 controlled by rollers in the depending ends of a yoke 138 which is manually controllable.

Tube 133 is drilled axially to provide a continuation therethrough of channel 132. Near the outer or lower end of tube 133 (as seen in Fig. 12) are positioned ports 139 adapted to permit escape of oil or other fluid from the interior of tube 133 to chamber A. Slidably mounted upon tube 133 is positioned a ring or collar 140 provided with internal oil-tight rings 141. In engagement with the outer or lower face of collar 140 is a coiled spring 142 whose other end is engaged by bracket 143 slidably mounted upon bolt 144 which is in screw-threaded engagement with the outer or lower end of tube 133. An adjusting nut 145 and a locking nut 146 in screw-threaded engagement with bolt 144 and in contact with bracket 143 provide means for adjusting the tension of spring 142.

The operation of the first modified form of device, shown in Figure 12, is as follows. When relative rotation between driving shaft 119 and driven shaft 125 sets up a pumping action in cylinders 121 tending to pump oil or other fluid from chamber A to chambers 128, a fluid pressure is set up in chambers 128. So long as this fluid is permitted freely to escape from chambers 128 to chamber A, there will be no substantial transfer of power from the driving shaft 119 to the driven shaft 125. Such venting of oil or other fluid from chambers 128 to chamber A through vent 131 may be accomplished by manual adjustment of the rotary valve 130, in the manner heretofore described. Rotary valve 130 may also be so adjusted that port 129 will be in communication with channel 132. When rotary valve 130 is so adjusted, oil will flow from chambers 128 through port 129, valve 130, channel 132 within the tube 133, and will vent through ports 139.

The length of the tube 133 and the position of the ports 139 in the side walls thereof, and the length of the collar member 140 are such that when the collar is at the inner limit of its movement (with the spring extended) the ports 139 are uncovered and fluid may pass from channel 132 through ports 139 to chamber A; but when the collar 140 is at the outer limit of its movement (against the compression of the spring 142), the ports 139 will be covered and closed by the collar 140. The weight of the collar 140, the distance of the valve mechanism here described from the center of the disc 120, and the resistance to compression of the spring 142, are so adjusted that when the motor is at rest or is idling the collar 140 will remain at its inner limit of movement (as seen in Fig. 12), but when the speed of the motor is increased above idling speed the collar 140 will be moved downwardly or outwardly under the influence of centrifugal force so as to partially cover, and then as speed increases, completely cover and seal ports 139.

The effect of such closing of ports 139, depending upon the speed of rotation of the driving shaft 119, is to produce a variable transmission of power from driving shaft 119 to driven shaft 125 whose operating characteristics will be similar to those hereinabove set forth in connection with the preferred form or embodiment of this invention.

*Second alternate form (Figs. 13 and 14)*

The second modified form of transmission device embodying this invention, is described as follows, having particular reference to Figures 13 and 14. A casing member 147 provided with a removable cover 148 and end plates 149 and 150 provides an oil-tight casing A. Extending within casing A, and journaled (by means not shown) in end wall 149 is rotatably mounted a driving shaft 151. Secured upon the end of driving shaft 151 is a disc 152 adapted to rotate with said shaft within the chamber A. Adjacent the lefthand face of disc 152 is positioned a bearing 153 supported by a spider 154 secured to the casing 147 in any suitable manner, as by bolts 155. Shaft 151 has formed integrally therewith a portion of enlarged diameter 156 containing a channel 157 drilled axially thereof and communicating with pressure chamber 158 near the end thereof. Pressure chamber 158 communicates with radial channels 159 formed within disc 152 and terminating near the periphery of said disc adjacent the outlet ports of the cylinders below described.

Two annular series of ports 160 and 161, spaced apart, provide a fluid communication between channel 157 and chamber A. Upon the enlarged portion 156 of shaft 151 are slidably mounted two collars 162 and 163 provided respectively with internal rings 162a and 163a. Collar 162 is arranged for manual movement longitudinally of enlarged portion 156 as follows. Rollers 164 operate within channel 165 of collar 162. Said rollers are secured on the depending ends of a yoke 166 secured upon cross-shaft 167. A hand valve-control lever 168 is also secured upon cross-shaft 167, and by movement of said lever 168, the collar 162 may be longitudinally moved along enlarged portion 156 of driving shaft 151 to assume any one of three control positions. In one of these positions, collar 162 is so positioned upon shaft 151 as to leave both series of ports 160 and 161 uncovered (shown in solid lines in Fig. 13). In another position collar 162 covers ports 160 and leaves ports 161 open (shown in dotted lines in Fig. 13). In the third position collar 162 covers ports 160 and also covers ports 161 (not shown in Fig. 13). The function of these three positions is hereinafter described. The oil-tight rings 162a and 163a are so positioned as to cooperate with the periphery of shaft 151 in preventing escape of oil from the port or ports covered by the respective collars 162 and 163.

Within an annular groove 84 in shaft 151 is secured a collar 169 in which are screw-threadedly secured two pivot pins 170 and 171. Upon pin 170 is pivotally mounted a weight 172, and upon pin 171 is pivotally mounted a weight 173. Links 174 and 175 are pivotally attached at one of their ends, respectively, to weights 172 and 173, and at their other ends, respectively, to pins 176 and 177 secured at diametrically opposite sides of collar 163. Springs 178 and 179 are connected respectively to pins 180 and 181 of weight 172, and to pins 182 and 183 respectively of weight 173. The tension of these springs is such as to oppose the centrifugal force which, when shaft 151 rotates, would tend to move weights 172 and 173 radially outward from shaft 151.

The arrangement of weights 172 and 173, links 174 and 175, and pivot pins 170 and 171, is such that outward radial movement of weights 172 and 173 under the influence of centrifugal force (tending to extend springs 178 and 179) will move collar 163 longitudinally of enlarged portion 156 from the position shown in solid lines in Figure 13 toward the position shown in dotted lines in Figure 13 covering ports 161.

On the righthand face of disc 152 are pivotally mounted a plurality of cylinders 184 having pistons 185 and connecting rods 186 secured thereto, all of the piston rods being mounted upon a common driving pin (not shown) secured near the periphery of disc 187 secured upon the end of driven shaft 188 journaled at 189 for rotation coaxially with driving shaft 151. One-way spring-held valve mechanisms 190 and 191 permit the flow of oil or other fluid from chamber A through cylinders 184 into channels 159 when a pumping action is set up in cylinders 184 due to relative rotation between driving shaft 151 and driven shaft 188. Inasmuch as the form or embodiment of the invention here described does not differ substantially, so far as concerns the pumping mechanism above referred to, from the corresponding parts of the preferred form hereinabove described, the details of that description will not be repeated here but will be understood to be here incorporated by reference.

The method of operation of the second modified form of device is as follows. Assuming collar 162 to be in its normal position (as shown in dotted lines in Figure 13), so that it covers and seals ports 160 but does not cover ports 161, and assuming the engine to be at rest or running at idling speed, the springs 178 and 179 will exert sufficient restraint upon weights 172 and 173 to prevent radial movement thereof away from the axis of driving shaft 151. Accordingly collar 163 will remain in the position shown in solid lines in Figure 13 leaving ports 161 uncovered. As relative rotation between disc 152 and disc 187 produces a pumping action tending to transfer fluid from chamber A through cylinders 184 and channels 159 to pressure chamber 158, the fluid will vent freely from pressure chamber 158 through channel 157 and ports 161 to return to chamber A. As the speed of the motor is increased, the centrifugal force acting upon weights 172 and 173 will increase so that these weights will move radially outward from the axis of shaft 151 thereby moving collar 163 to the right (as seen in Fig. 13) and thus tending to close ports 161. As the opening of ports 161 is restricted, the flow of fluid therethrough is restricted. As such flow is restricted, pressure builds up in pressure chamber 158 and thereby resistance is introduced to the pumping action and power will be transmitted from driving shaft 151 to driven shaft 188. When the speed of the motor has increased to an extent sufficient to move collar 163 to the position shown in dotted lines in Figure 13, so that ports 161 are completely covered, there will be no further flow of oil and no more pumping action will be possible. Accordingly, there can be no free "slippage" between the driven shaft and the driving shaft and both will rotate at the same speed.

If it is desired to introduce relative rotation between the driving shaft and the driven shaft, as for example when it is desired that the car shall "coast", valve control lever 168 is moved forwardly from its normal position so that collar 162 is moved rearwardly (to the right as seen in Fig. 13) from the position shown in dotted lines to the position shown in solid lines in Figure 13. This opens ports 160 and permits escape of oil through ports 160 from pressure chamber 158 to chamber A. Such escape of oil permits free pumping action, as above described, enabling "slippage" to be introduced at will between the driving shaft and the driven shaft.

When it is desired to secure a locked relationship between the driving and the driven shafts, notwithstanding the fact that the engine is at rest or is at idling speed so that ports 161 are uncovered, collar 162 is moved to its extreme forward position covering both series of ports 160 and 161. Such arrangement is useful, for example, in starting the motor by coasting down hill or by towing, and the like. When this arrangement is used to start the engine by, for example, rolling down hill, and the engine at length fires and speeds up, the increase in speed of the engine will cause the weights 172 and 173 to move outwardly under the influence of centrifugal force and thus cause collar 163 to move to the right as seen in Fig. 13. Such movement of collar 163 will push collar 162 rearwardly to its normal position covering ports 160 but not covering ports 161. Thus, an especial advantage is inherent in this form of my device, in that it is automatically self-restoring to normal operating condition after the collar 162 has been advanced to its extreme forward position for the unusual purpose above stated.

In other respects the mode of operation of the second modified form, here described, is similar to the mode of operation of the preferred form of the invention as set forth above. Accordingly such description is not here repeated.

The "valve control lever" hereinabove referred to in connection with each of the forms of embodiment of this invention may take any convenient form. For example, it need not be a hand lever, but may be connected to a foot pedal in a manner which it is not necessary here to describe. Or, if desired, it may be arranged as a small handle situated on the instrument board of the automobile.

I claim:

1. In combination, a fluid chamber, a driving shaft having an end thereof within said chamber, a driven shaft having an end thereof within said chamber and in axial alinement with said first shaft, a driving pin eccentrically mounted upon said driven shaft, a disc secured upon said driving shaft near the end thereof and rotatable therewith, a plurality of pumping cylinders pivotally mounted on said disk for rotation therewith and having pistons and connecting rods, said connecting rods being pivoted in common upon said driving pin, a fluid pressure chamber adapted to receive fluid from said pumping cylinders when there is relative rotation between the shafts, and adjustable centrifugal means for controlling the escape of fluid from said pressure chamber actuated by the speed of rotation of said driving shaft.

2. In combination, a fluid chamber, a first shaft having an end thereof within said chamber, a second shaft having an end thereof within said chamber and in axial alinement with said first shaft, a driving pin eccentrically mounted upon said second shaft, a plurality of pumping cylinders mounted for rotation with said first-mentioned shaft and having driving connections mounted in common upon said driving pin, a fluid circuit including a source of fluid supply, a pressure chamber and said cylinders, said cylinders being adapted to draw fluid from said source and deliver it to said chamber, centrifugal means responsive to the rotational speed of said driving shaft for diminishing the return of fluid from said pressure chamber to said supply source upon increase of the driving shaft speed, and selective means for controlling and preventing at will the said return of fluid.

3. In combination, a fluid chamber, a first shaft having an end thereof within said chamber, a second shaft having an end thereof within said chamber and in axial alinement with said first shaft, a driving pin eccentrically mounted upon said second shaft, a plurality of pumping cylinders mounted for rotation with said first-mentioned shaft and having driving connections mounted in common upon said driving pin, a fluid circuit including said pumping cylinders and also including two ports in parallel relationship in said circuit, centrifugal means for restricting the flow of fluid through one of said ports as the speed of rotation of the first-mentioned shaft is increased, and selective means for controlling and preventing at will the flow of fluid through both of said ports.

4. In a fluid transmission system containing pumping cylinders operative to pump fluid when there is relative rotation between the driving and the driven shafts, in combination, a pressure chamber to which fluid is pumped, an outlet channel communicating with said chamber, a manually operable valve for opening, closing and venting at will said channel, a second valve for controlling the flow of fluid from said channel when open, and weight means mounted for rotation with the driving shaft and adapted to move under the influence of centrifugal force to close said second-mentioned valve when the speed of rotation of said shaft increases.

5. In a fluid transmission system containing pumping cylinders operative to pump fluid in a closed circuit when there is relative rotation between the driving and the driven shafts, in combination, a source of fluid supply for said pump, a pressure chamber adapted to receive fluid from the pump, a fluid passageway for the return of fluid from said chamber to said source of supply, an outlet port for said passageway, a member secured to the driving shaft for rotation therewith, a valve for said port mounted for rotation with said member and adapted to move radially with respect to the axis of the driving shaft and to cover said port at the limit of its movement remote from the axis of said shaft, resilient means adapted to oppose said outward radial movement of said valve and to urge said valve to move radially inward toward the axis of said shaft and to uncover said port and a second-mentioned valve selectively operable at will to permit control and prevent return of fluid from said pressure chamber to said source irrespective of the operative position of said first-mentioned valve.

6. A device according to claim 5, in which the first-mentioned valve consists of a longitudinally drilled piston, said piston being positioned within a cylindrical portion of said passageway for longitudinal movement therein to cover and uncover said port.

7. A device according to claim 5, in which the first-mentioned valve comprises a ring, said ring being externally mounted upon a cylindrical member containing said passageway for longitudinal movement thereon to cover and uncover said port.

8. In combination, means to pump fluid to a pressure chamber, said means being actuated by relative rotation between a driving shaft and a driven shaft, a fluid passageway for escape of fluid from said chamber, a manually operable valve effective at an intermediate point of said passageway for at will permitting flow of fluid from end to end of said passageway, opposing the flow of fluid past said intermediate point in said passageway, and venting fluid from the passageway at said intermediate point, and a spring-balanced valve effective at one end of said passageway adapted to close said passageway as the speed of rotation of said driving shaft increases and to open the same as said speed decreases.

9. A device according to claim 8, in which said manually operable valve comprises a cylindrical casing having inlet and outlet ports, and a cylindrical valve mounted for rotation within said casing about its longitudinal axis to cover and uncover said ports.

10. A device according to claim 8, in which said manually operable valve comprises a fluid channel within a tubular member having two ports therein, and a sleeve fitting upon said member and adapted to slide longitudinally thereof, whereby a partial traverse of said sleeve closes one of said ports and a further traverse thereof closes both of said ports.

11. In combination, a driving shaft, a driven shaft mounted in axial alignment therewith, a plurality of pumping cylinders mounted for rotation with one of said shafts, pistons in each of said cylinders, connecting rods for each of said pistons, a common pivotal mounting for the ends of said connecting rods eccentrically secured to the other of said shafts, a source of fluid supply communicating with said cylinders for supply thereof, a fluid pressure chamber into which said cylinders discharge and which discharges into said fluid source, valve means responsive in its operation to the speed of rotation of the driving shaft for controlling the return flow of fluid from said pressure chamber to said source of supply, and supplementary valve means selectively operable at will to permit and at will to prevent said fluid return flow irrespective of the operative condition of said first-mentioned valve means.

12. In combination, a driving shaft, a driven shaft mounted in axial alignment therewith, a plurality of pumping cylinders mounted for rotation with one of said shafts, pistons in each of said cylinders, connecting rods for each of said pistons, a common pivotal mounting for said connecting rods eccentrically secured to the other of said shafts, a source of fluid supply communicating with said cylinders for supply thereof, a fluid pressure chamber into which said cylinders discharge and which discharges into said fluid source, valve means responsive to the speed of rotation of the driving shaft for diminishing the return flow of fluid from said pressure chamber to said source of supply as the speed of rotation of said driving shaft increases, and supplementary valve means selectively operable at will to permit the free return flow or to prevent return flow of said fluid from said pressure chamber to said source of supply at any speed of rotation of said driving shaft.

13. In combination, a driving shaft, a driven shaft mounted in axial alignment therewith, a plurality of pumping cylinders mounted for rotation with one of said shafts, pistons in each of said cylinders, connecting rods for each of said pistons, a common pivotal mounting for said connecting rods eccentrically secured to the other of said shafts, a source of fluid supply communicating with said cylinders for supply thereof, a fluid pressure chamber into which said cylinders discharge and which discharge into said fluid source, valve means responsive to the speed of rotation of the driving shaft for increasing the return flow of fluid from said pressure chamber to said source of supply as the speed of rotation of said driving shaft decreases, and supplementary valve means selectively operable at will to decrease and to prevent said return flow at any speed of rotation of said driving shaft.

14. In a fluid power transmission system containing pumping cylinders operative to pump fluid in a closed circuit when there is relative rotation between the driving and the driven shafts, in combination, a source of fluid supply for said cylinders, a pressure chamber adapted to receive fluid from the cylinders, a fluid passageway for the return of fluid from said chamber to said source of supply, an outlet port for said passageway, valve mechanism to control the flow of fluid through said port comprising a collar slidably engaged upon the shaft which supports the pumping cylinders, means centrifugally responsive to the speed of rotation of the driving shaft tending to move said collar longitudinally of the shaft on which it is mounted and in a direction to cover said port as the speed of rotation of the driving shaft increases, and selectively operable means supplementary to said first-mentioned means for permitting and preventing at will the return of fluid from said chamber to said source irrespective of the speed of rotation of said driving shaft.

15. In a fluid power transmission system, in combination, a driving shaft, a driven shaft, means to pump fluid in a closed circuit when there is relative rotation between said shafts, a source of fluid supply for said pumping means, a pressure chamber to which fluid is delivered by said pumping means, a valve to control the return of fluid from said pressure chamber to said source of supply adapted to be centrifugally responsive to the speed of rotation of the driving shaft to close as said speed increases, resilient means to oppose said closing of said valve and to open said valve as said speed decreases, adjusting means to vary the tension of said resilient means to select at will the speeds at which said valve will open and close, and a second valve selectively operable at will to permit and at will to prevent the return of fluid from said pressure chamber to said source of supply at any speed of rotation of said driving shaft.

16. In a fluid power transmission system, in combination, pumping cylinders operative to pump fluid in a closed circuit when there is relative rotation between the driving and the driven shafts, a source of fluid supply for said cylinders, a pressure chamber to receive fluid discharged from said cylinders, a plurality of outlet ports for said pressure chamber communicating with said source of supply to complete the closed fluid circuit, a first slide valve centrifugally responsive to the speed of rotation of said driving shaft to move in a direction to cover one of said ports as the speed of rotation of said driving shaft increases and in the opposite direction to uncover said port as the speed of rotation of said driving shaft decreases, and a second slide valve manually operable at will to cover another of said ports when the first-mentioned port is covered by said first slide valve, and to cover both of said ports when the first-mentioned port is uncovered by said first slide valve.

17. In a fluid power transmission system, in combination, a driving shaft, a driven shaft, means to pump fluid in a closed circuit when there is relative rotation between said shafts, a source of fluid supply for said pumping means, a pressure chamber to which fluid is delivered by said pumping means, and means for controlling the back pressure load upon said pumping means comprising a first escape valve for said pressure chamber selectively adjustable at will to vent fluid from the pressure chamber to the source of supply, to confine fluid within the pressure chamber and to deliver fluid from the pressure chamber to a point at which it is under control of the second escape valve below mentioned, and a second escape valve for said pressure chamber operatively responsive to the speed of rotation of the driving shaft to open as said speed decreases and to close as said speed increases.

18. In a fluid power transmission system, in combination, a driving shaft, a driven shaft in axial alignment therewith, a plurality of cylinders mounted for rotation with one of said shafts, each of said cylinders being pivotally mounted respectively upon a trunnion permitting arcuate oscillation thereof, pistons for said cylinders, a connecting rod rigidly secured to each of said pistons, a common pivotal mounting for the ends of said connecting rods eccentrically secured to the other of said shafts, a closed fluid circuit including a source of supply, said cylinders, and a pressure chamber, valve means centrifugally responsive to a decrease in the speed of rotation of said driving shaft to vent fluid from said pressure chamber to said source of supply, and supplementary valve means selectively operable at will to vent, and at will to prevent the flow of, fluid from said chamber to said source at any speed of rotation of said driving shaft.

19. In a fluid power transmission system comprising means to pump fluid when there is relative rotation between a driving shaft and a driven shaft, a passageway for venting fluid from a pressure chamber, a port in said passageway, a slide valve adapted to cooperate with said port and manually operable to a position covering said port, and a second slide valve adapted to cooperate with said port and centrifugally responsive to the speed of rotation of the driving shaft to move to a position covering said port as said speed increases and thereby to shift said first-mentioned valve away from a position covering said port.

20. In combination, a fluid chamber, a first shaft having an end thereof within said chamber, a second shaft having an end thereof within said chamber and in axial alinement with said first shaft, a driving pin eccentrically mounted upon said second shaft, a plurality of pumping cylinders mounted for rotation with said first mentioned shaft and having driving connections mounted in common upon said driving pin, a fluid circuit including said pumping cylinders and also including two ports in parallel relationship in said circuit, centrifugal means for restricting the flow of fluid through one of said ports as the speed of rotation of the first-mentioned shaft is increased, and selective means for controlling and preventing at will the flow of fluid through either or both of said ports.

21. In a fluid transmission system comprising a driving and a driven shaft and containing a closed circuit and pumping cylinders operative to force fluid through said circuit when there is relative rotation between the driving and driven shafts, in combination, a source of fluid supply for said pumping cylinders, a pressure chamber adapted to receive fluid from the pumping cylinders, a fluid passageway for the return of fluid from said chamber to said source of supply, an outlet port for said passageway, a member secured to said driving shaft for rotation therewith, a valve for said port mounted for rotation with said member and adapted to move radially with respect to the axis of the driving shaft and to cover said port at the limit of its movement remote from the axis of said shaft, said valve being outwardly movable by centrifugal force developed therein by rotation of said driving shaft, and resilient means connected to said valve to oppose outward movement thereof and normal to hold said valve with said port uncovered.

22. A device according to claim 21 in which said valve consists of a longitudinal drilled piston, said piston being positioned within a cylindrical portion of said passageway for longitudinal movement therein to cover and uncover said port.

23. A device according to claim 21 in which said valve comprises a ring, said ring being exteriorly mounted upon a cylindrical member containing said passageway for longitudinal movement thereon to cover and uncover said port.

24. A device according to claim 21 in which means are provided for adjusting the tension of said resilient means.

25. In a fluid power transmission system containing pumping cylinders operative to pump fluid in a closed circuit when there is relative rotation between the driving and the driven shafts, in combination, a source of fluid supply for said pump, a pressure chamber adapted to receive fluid from the pumps, a fluid passageway for the return of fluid from said chamber to said source of supply, an outlet port for said passageway, valve mechanism to control the flow of fluid through said port comprising a collar slidably engaged upon one of said shafts, and means centrifugally responsive to the speed of rotation of the driving shaft to move said collar longitudinally of the shaft upon which it is engaged and in a direction tending to cover said port as the speed of rotation of said driving shaft increases, and in the opposite direction tending to uncover said port as said speed decreases.

26. In a fluid transmission system comprising a driving and a driven shaft and containing a closed circuit and pumping cylinders operative to force fluid through said circuit when there is relative rotation between the driving and driven shafts, in combination, a source of fluid supply for the said pumping cylinders, a pressure chamber adapted to receive fluid from the pumping cylinders, a fluid passageway for the return of fluid from said chamber to said source of supply, said passageway being in a tubular member having a pair of outlet ports for said passageway, a sleeve valve slidably mounted on said tubular member for opening and closing one of said ports, means centrifugally responsive to the speed of rotation of said driving shaft to move said sleeve longitudinally of said tubular member and in a direction tending to close said port as the speed of rotation of said shaft increases and in the opposite direction as said speed decreases, a second sleeve mounted on said tubular member and of sufficient size to simultaneously close both said ports, and manually operable means for moving said second sleeve into position to close both said ports when said first sleeve is out of port-closing position.

27. A device according to claim 26 in which the driving shaft constitutes such tubular member.

28. In a fluid transmission system, a driving shaft, a driven shaft, a driving pin eccentrically mounted upon said driven shaft, a disk mounted on the end of said driving shaft, said disk containing a pressure chamber, a plurality of pumping cylinders mounted on said disk and discharging into said pressure chamber, pistons in said cylinders connected to said driving pin, a passageway leading from said pressure chamber through said driving shaft and terminating in a radially arranged port, a sleeve valve slidably mounted on said shaft for opening and closing said port, and means responsive to the rotational speed of said driving shaft to move said sleeve in a direction tending to close said port as the rotational speed of said shaft increases and in the opposite direction as said speed decreases.

29. In a fluid transmission system, a driving shaft, a driven shaft, a driving pin eccentrically mounted upon said driven shaft, a disk mounted on the end of said driving shaft, said disk containing a pressure chamber, a plurality of pumping cylinders mounted on said disk and discharging into said pressure chamber, pistons in said cylinders connected with said driving pin, a passageway leading from said pressure chamber through said driving shaft and terminating in a pair of longitudinally spaced axially arranged outlet ports, a sleeve valve slidably mounted on said tubular member for opening and closing one of said ports, means responsive to the rotational speed of said driving shaft to move said sleeve longitudinally thereof and in a direction tending to close said port as the rotational speed of said shaft increases and in the opposite direction as said speed decreases, a second sleeve mounted on said shaft and manually operable means for moving said second sleeve to cover and uncover said second portion.

30. A device according to claim 29 in which said second sleeve is of sufficient size to simultaneously close both said ports.

31. In combination, a driving shaft, a driven shaft in axial alinement therewith, a plurality of pumping cylinders mounted for rotation with one of said shafts and having their pistons connected in common to a pin eccentrically secured to the other of said shafts, a closed fluid circuit including a source of fluid supply, a pressure chamber, said cylinders, and a passage for return of fluid from said chamber to said source, said cylinders being adapted to draw fluid from said source and deliver it to said chamber, centrifugal means responsive to the rotational speed of the driving shaft for diminishing the return of fluid from said pressure chamber to said supply source upon increase of the driving shaft speed, and selective means for increasing and diminishing at will the said return of fluid at any speed of the driving shaft.

32. A device according to claim 31 in which the centrifugal means consists in part of a valve member adapted to slide longitudinally of one of said shafts to cover and uncover a port.

WILLIAM C. BRADEN.

CERTIFICATE OF CORRECTION.

Patent No. 2,071,493.            February 23, 1937.

WILLIAM C. BRADEN.

It is hereby certified that error appears in the printed specification of the above numbered patent requiring correction as follows: Page 9, first column, line 57, claim 13, for the words "which discharge" read which discharges; and that the said Letters Patent should be read with this correction therein that the same may conform to the record of the case in the Patent Office.

Signed and sealed this 30th day of March, A. D. 1937.

Henry Van Arsdale
Acting Commissioner of Patents.

(Seal)

29. In a fluid transmission system, a driving shaft, a driven shaft, a driving pin eccentrically mounted upon said driven shaft, a disk mounted on the end of said driving shaft, said disk containing a pressure chamber, a plurality of pumping cylinders mounted on said disk and discharging into said pressure chamber, pistons in said cylinders connected with said driving pin, a passageway leading from said pressure chamber through said driving shaft and terminating in a pair of longitudinally spaced axially arranged outlet ports, a sleeve valve slidably mounted on said tubular member for opening and closing one of said ports, means responsive to the rotational speed of said driving shaft to move said sleeve longitudinally thereof and in a direction tending to close said port as the rotational speed of said shaft increases and in the opposite direction as said speed decreases, a second sleeve mounted on said shaft and manually operable means for moving said second sleeve to cover and uncover said second portion.

30. A device according to claim 29 in which said second sleeve is of sufficient size to simultaneously close both said ports.

31. In combination, a driving shaft, a driven shaft in axial alinement therewith, a plurality of pumping cylinders mounted for rotation with one of said shafts and having their pistons connected in common to a pin eccentrically secured to the other of said shafts, a closed fluid circuit including a source of fluid supply, a pressure chamber, said cylinders, and a passage for return of fluid from said chamber to said source, said cylinders being adapted to draw fluid from said source and deliver it to said chamber, centrifugal means responsive to the rotational speed of the driving shaft for diminishing the return of fluid from said pressure chamber to said supply source upon increase of the driving shaft speed, and selective means for increasing and diminishing at will the said return of fluid at any speed of the driving shaft.

32. A device according to claim 31 in which the centrifugal means consists in part of a valve member adapted to slide longitudinally of one of said shafts to cover and uncover a port.

WILLIAM C. BRADEN.

CERTIFICATE OF CORRECTION.

Patent No. 2,071,493.   February 23, 1937.

WILLIAM C. BRADEN.

It is hereby certified that error appears in the printed specification of the above numbered patent requiring correction as follows: Page 9, first column, line 57, claim 13, for the words "which discharge" read which discharges; and that the said Letters Patent should be read with this correction therein that the same may conform to the record of the case in the Patent Office.

Signed and sealed this 30th day of March, A. D. 1937.

Henry Van Arsdale
Acting Commissioner of Patents.

(Seal)

CERTIFICATE OF CORRECTION.

Patent No. 2,071,493.　　　　　　　　　　　　　　　　February 23, 1937.

WILLIAM C. BRADEN.

It is hereby certified that error appears in the printed specification of the above numbered patent requiring correction as follows: Page 9, first column, line 57, claim 13, for the words "which discharge" read which discharges; and that the said Letters Patent should be read with this correction therein that the same may conform to the record of the case in the Patent Office.

Signed and sealed this 30th day of March, A. D. 1937.

(Seal)

Henry Van Arsdale
Acting Commissioner of Patents.